United States Patent [19]
Casby et al.

[11] Patent Number: 6,085,428
[45] Date of Patent: Jul. 11, 2000

[54] HANDS FREE AUTOMOTIVE SERVICE SYSTEM

[75] Inventors: Alan D. Casby, Conway; David R. Coburn, II, Maumelle; George M. Gill, Vilonia; Richard J. Poe, Conway; Steven W. Rogers, Maumelle, all of Ark.

[73] Assignee: Snap-On Technologies, Inc., Lincolnshire, Ill.

[21] Appl. No.: 08/920,027

[22] Filed: Aug. 26, 1997

Related U.S. Application Data

[63] Continuation of application No. 08/655,281, May 15, 1996, which is a continuation of application No. 08/131,641, Oct. 5, 1993.

[51] Int. Cl.$^7$ ............................... G01C 15/10; G09G 5/00
[52] U.S. Cl. ................................... 33/286; 356/155; 345/8
[58] Field of Search ............................ 345/9, 10, 8, 168, 345/140, 156, 134, 158; 348/53; 324/379; 356/155; 364/708.1; 33/288, 286, 203.18

[56] References Cited

U.S. PATENT DOCUMENTS

| | | | |
|---|---|---|---|
| 4,381,548 | 4/1983 | Grossman et al. | 364/551 |
| 4,677,429 | 6/1987 | Glotzbach | 345/168 |
| 4,931,964 | 6/1990 | Titsworth et al. | 364/559 |
| 5,003,300 | 3/1991 | Wells | 345/8 |
| 5,068,645 | 11/1991 | Drumn | 345/158 |
| 5,162,828 | 11/1992 | Furness et al. | 359/618 |
| 5,245,324 | 9/1993 | Jonker et al. | 345/134 |
| 5,281,957 | 1/1994 | Schoolman | 345/8 |
| 5,305,244 | 4/1994 | Newman et al. | 364/708.1 |
| 5,313,711 | 5/1994 | Kling, III et al. | 356/155 |
| 5,334,821 | 8/1994 | Campo et al. | 326/380 |
| 5,345,538 | 9/1994 | Narayannan et al. | 395/2.84 |

FOREIGN PATENT DOCUMENTS

| | | |
|---|---|---|
| 62-14376 | 4/1987 | Japan . |
| 63-297149 | 12/1988 | Japan . |
| 5-48991 | 2/1993 | Japan . |

OTHER PUBLICATIONS

"Speech Thing," Covox Inc., sales brochure, 1992.
"Voice Master," Covox Inc. sales brochure, 1992.
"Virtual Vision Sport," Virtual Vision, Inc. sales brochure, May 1993.
"Star Trek Technology is Improving," FMC Inside Track, Jul. 2, 1993.

*Primary Examiner*—Lun-Yi Lao
*Attorney, Agent, or Firm*—McDermott, Will & Emery

[57] ABSTRACT

A voice control system for an automotive service system includes a microphone, through which a technician can communicate voice commands to an item of automotive service equipment within the automotive service system, a speech processor module for converting the voice commands into digital instructions which can be processed by a system controller and for converting data from the system controller into synthesized voice audio, and a speaker for communicating the synthesized voice audio to the technician. The system of the present invention may also include a pair of goggles incorporating a heads-up display which displays the data from the system controller by virtual image in the technician's forward field of vision without blocking his general forward field of view.

20 Claims, 3 Drawing Sheets

HANDS FREE AUTOMOTIVE SERVICE SYSTEM

This application is a continuation of application Ser. No. 08/655,281, filed on May 15, 1996 now abandoned, which is a continuation of application Ser. No. 08/131,641, filed on Oct. 5, 1993, now abandoned.

BACKGROUND OF THE INVENTION

1. Field of the Invention

The present invention relates to a system for operating automotive service equipment and, in particular, to an apparatus and method for operating such a system through voice commands, thus leaving the automotive service technician's hands free to effect adjustments on the vehicle.

2. Description of Related Art

Existing automotive service equipment, such as vehicle wheel aligners and balancers, often include computers to process data input by the technician or generated by sensors and display the results and additional information and instructions through video monitors. Since this equipment incorporates a considerable amount of computerized data processing, the automotive service technician is typically required to operate the equipment by means of a keyboard while viewing the monitor, which is usually mounted on a main console. The technician is therefore often required to direct much of his attention to the console and away from the vehicle being serviced.

The introduction of a hand held remote control devices has reduced the need to use the keyboard as often, but still requires the technician to use his hands and direct his attention to a main console in order to operate the equipment. While remote displays have further reduced this requirement by displaying some of the information generated by the computer, they too must be hand carried and hand manipulated.

SUMMARY OF THE INVENTION

The present invention disposes of the need for the technician to approach a main console to enter data through a keyboard and observe a central video monitor during operation of the automotive service equipment. It likewise requires no hand-held devices such as remote displays or controls. The technician may therefore service the vehicle more quickly and efficiently since his hands are free to work on the vehicle without the need to punch a keyboard or monitor a video console to operate the equipment.

The system of the present invention enables the technician to operate the automotive service equipment through voice commands, and to receive data and instructions from the equipment through pre-recorded or synthesized voice audio. The system comprises a microphone, through which the technician can communicate the voice commands to the automotive service equipment, a speech processor module for converting the voice commands into digital instructions which can be processed by a central processing unit ("CPU") and for converting data from the CPU into pre-recorded or synthesized voice audio, and a speaker for communicating the pre-recorded or synthesized voice audio to the technician. The microphone and speaker are preferably housed in an audio headset which is worn by the technician. In addition, the headset is preferably connected to a radio frequency transceiver worn on the technician's belt which transmits and receives information to and from a corresponding transceiver connected to the speech processor module. For those that still wish to have a visual display of the data and instructions generated by the CPU, the system of the present invention may also include a pair of goggles incorporating a heads-up display which displays the information by virtual image in the technician's forward field of vision without blocking his general forward field of view.

The system of the present invention can be used to control any type of automotive service equipment that includes or is controlled by a CPU, or any similar computer control means, such as wheel aligners, wheel balancers and vehicle lifts and jacks, or any combination of such equipment.

These and other objects and advantages of the present invention will be made apparent from the following detailed description, with reference to the accompanying drawings.

DETAILED DESCRIPTION OF THE PREFERRED EMBODIMENTS

The system of the present invention comprises several components which enable an automotive service technician to operate automotive service equipment through voice commands, and to receive data and instructions from the equipment through pre-recorded or synthesized voice audio, messages. The system can be used in combination with any item of automotive service equipment which comprises or is otherwise controlled by a central processing unit ("CPU"), or any similar computer control means, and can be used to control multiple items of automotive service equipment.

Figure 1:
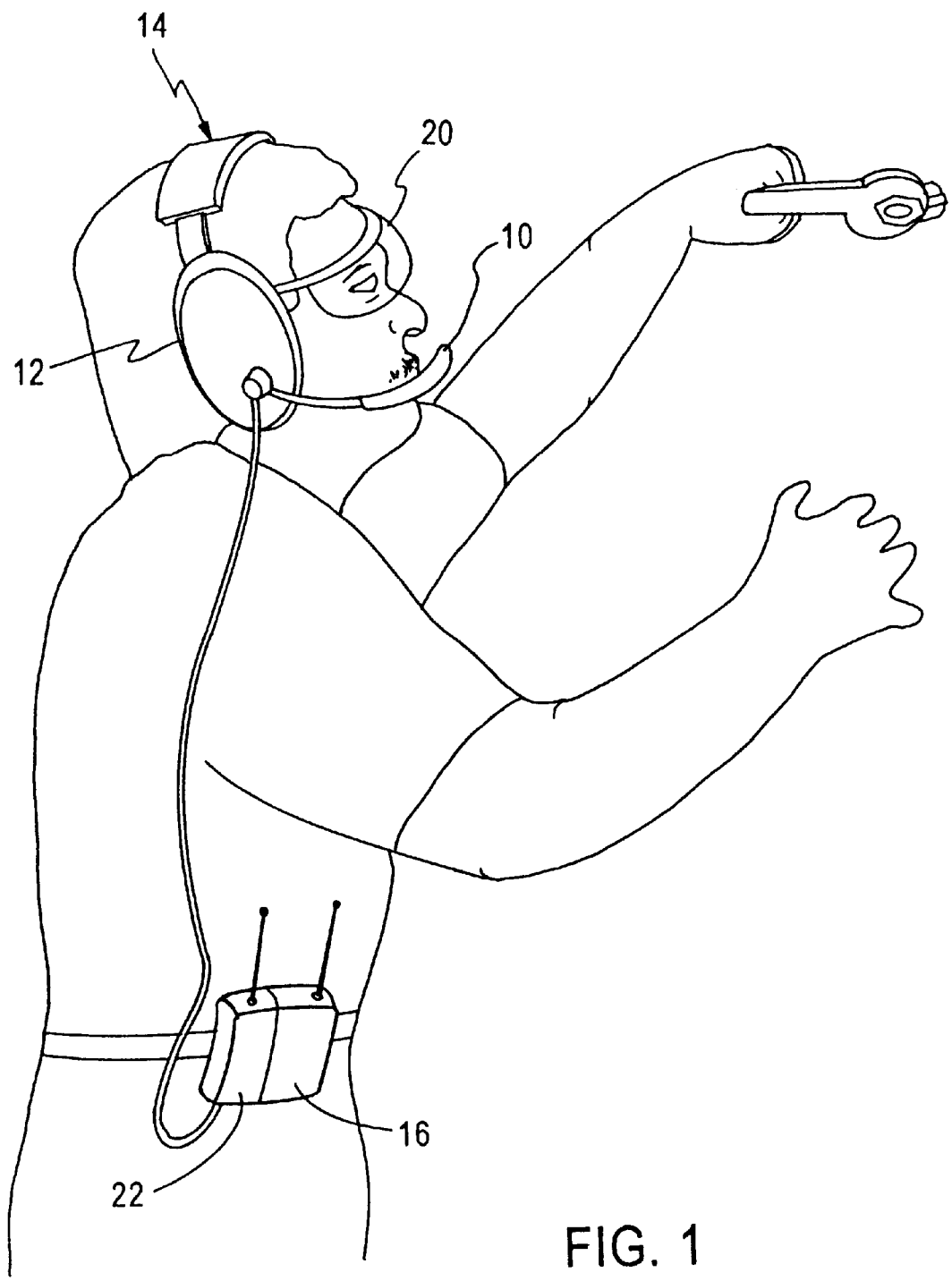
FIG. 1 is a representation of an automotive service technician outfitted with several components of the invention.
Figure 4:
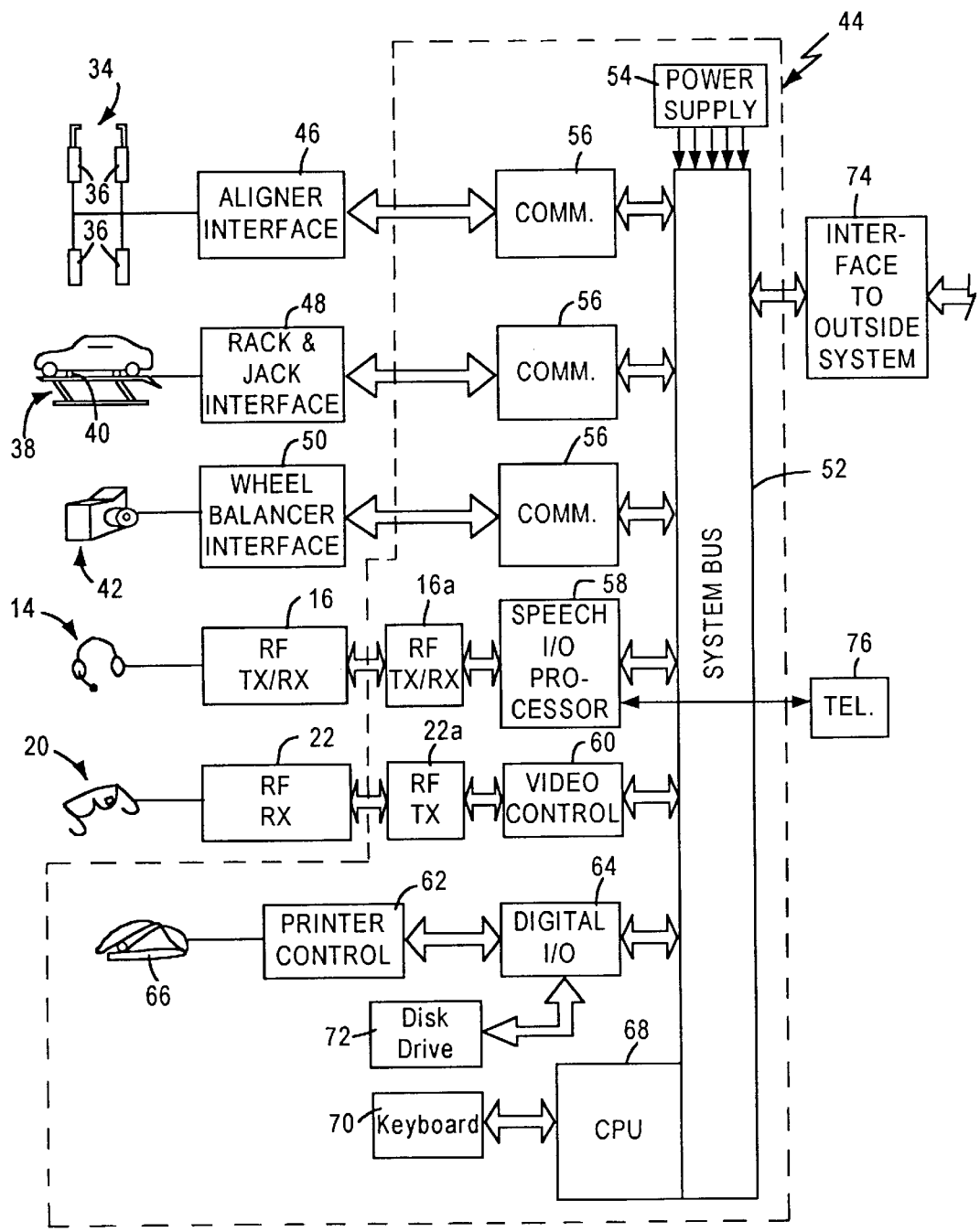
FIG. 4 is a block diagram of an automotive service system including the control system of the present invention.

Referring to FIG. 1, the automotive service equipment control system of the present invention is shown to comprise a microphone 10, through which the technician can communicate voice commands to a central console (not shown), and a speaker 12, through which data and instructions in the form of pre-recorded or synthesized voice audio are communicated from the console to the technician. Microphone 10 and speaker 12 are preferably mounted in a headset 14, such as the "DCNC" headset available from the David Clark Company of Worchester, Mass., which can be worn by the technician to thereby free up his hands so that he can make adjustments to the vehicle while operating the automotive service equipment. However, either microphone 10 or speaker 12, or both, may be mounted to other components, such as the console. The system also includes a transceiver 16 for transmitting and receiving communications between headset 14 and the console. While transceiver 16 can be connected to the console by wire, it preferably is a wireless transmission means, such as a radio frequency transceiver of the type generally known in the art, which communicates with a corresponding transceiver 16a located in the console (FIG. 4). In this fashion, transceiver 16 can be worn on the belt so that the technician is free to move about the vehicle being serviced.

Figure 2:
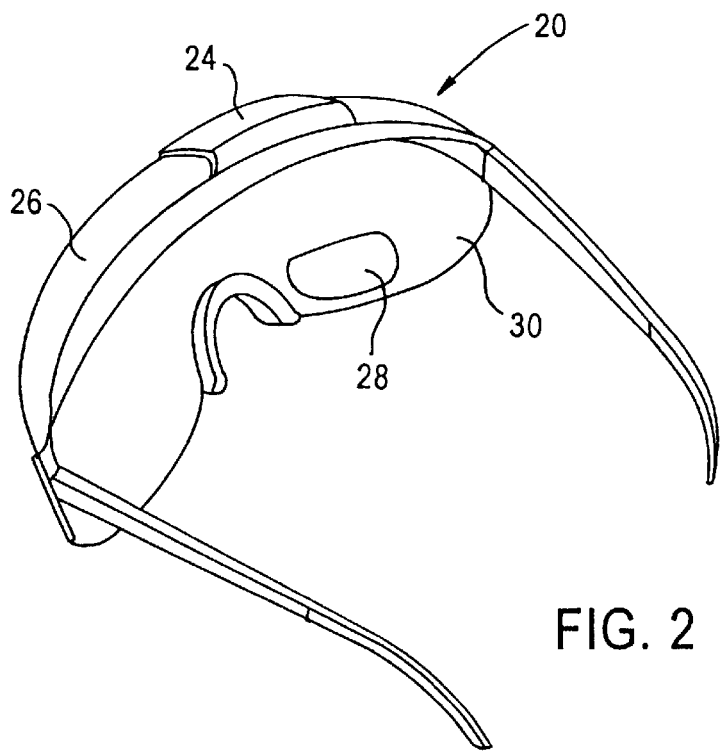
FIG. 2 is a perspective view of the goggles component of the invention.
Figure 3:
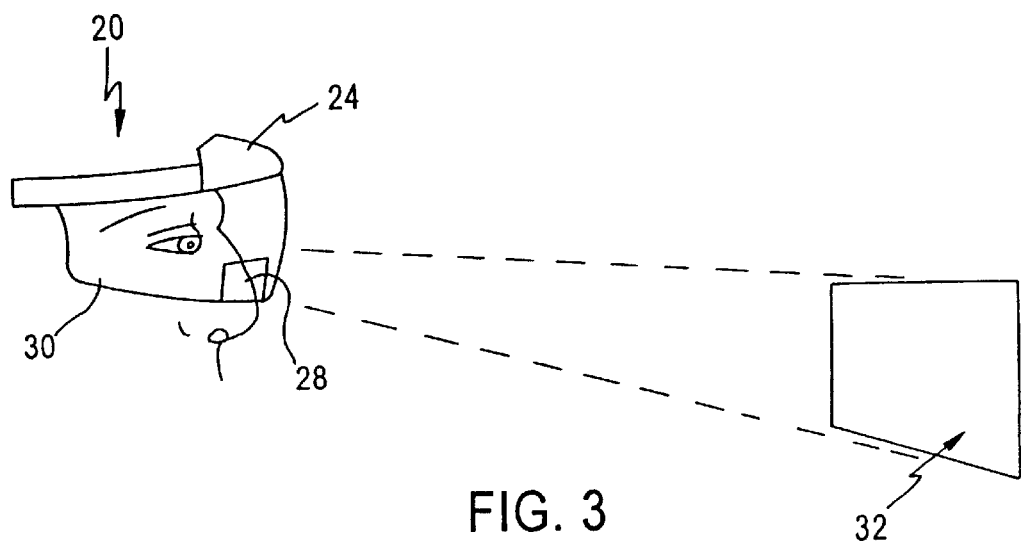
FIG. 3 is a partial perspective view of the goggles depicted in FIG. 2 and a representation of the relative location of the apparent or virtual image generated by the goggles.

The control system of the present invention also preferably includes a portable video display means, such as heads-up display goggles 20, which may display data and information received from the console via a wireless receiver 22, such as a radio frequency receiver, worn on the technician's belt. Receiver 22 communicates with a corresponding transmitter 22a located in the console (FIG. 4). Heads-up display goggles 20 may comprise an LED or an LCD display, but a suitable embodiment of goggles 20 is the "Virtual Vision Sport" portable television available from Virtual Vision, Inc. of Redmond Wash. Referring to FIGS. 2 and 3, heads-up display goggles 20 contain the components of a video display 24 on a brow bar 26, and a reflective lens 28 mounted to a transparent goggle lens 30. The image generated by video display 24 is reflected off of lens 28 and appears as a virtual image projection 32 approximately five feet wide at a distance of eight to fifteen feet in front of the wearer. Outfitted with goggles 20, the technician is able to simultaneously view both the vehicle and the information and data received from the console. Thus, the technician is allowed to, for example, view information regarding a particular adjustment that needs to be made while at the same time perform the adjustment.

Referring to FIG. 4, the control system of the present invention is shown combined with one possible configuration of an automotive service system. The automotive service system comprises several operational components, including a vehicle wheel aligner 34, which, as described more fully in U.S. Pat. No. 4,761,749 issued to Titsworth et al., includes four wheel mountable alignment heads 36 containing sensors for generating signals indicative of the orientation of each wheel. The automotive service system also comprises a vehicle lift or rack 38, which may include one or more jacks 40, and a wheel balancer 42. Aligner 34, rack 38 and balancer 42 communicate with the console, indicated generally by reference number 44, through appropriate interfaces 46, 48 and 50, respectively, which may be, for example, either electrical wires, wireless radio or infrared transceivers, or fiber optics.

Console 44 comprises a system bus 52 which is powered by a power supply 54. Power supply 54 also provides power for a number of functional modules, including a number of communications modules 56, each of which is disposed between system bus 52 and an item of automotive service equipment and operates to transmit data between the automotive service equipment and system bus 52, as described in applicant's co-pending U.S. patent application Ser. No. 07/817,250. A speech processor module 58 is disposed between system bus 52 and headset 14 and operates to provide data to the system bus in response to voice commands received by microphone 10 and to provide pre-recorded or synthesized voice audio to speaker 12 in response to data carried on system bus 52, as will be described. A video control module 60, which includes a video graphics array ("VGA") card such as the "VG 7700" card available from DFI, Inc. of Sacramento, Calif., is disposed between system bus 52 and heads-up display goggles 20 and operates to drive video display 24 so that data on system bus 52 may be displayed visually by goggles 20. A printer control module 62 is disposed between a digital input/output means 64, which in turn is coupled to system bus 52, and a printer 66 for providing data from system bus 52 in printed form. Each of the functional modules M include a controller. For example, each of communications modules 56 preferably includes a microprocessor such as the Siemans 80C535 microprocessor.

A main CPU 68 is also connected to system bus 52 and provides overall control for the automotive service system by performing calculations and managing tasks. CPU 68 comprises a controller, such as the Intel 80386 microprocessor. Although not necessary to the operation of the present invention, console 44 may also include a keyboard 70 and a disk drive 72 through which vehicle specifications, instructions or the like may be communicated to CPU 68. In addition, the system may communicate with external systems through an interface 74.

Speech processor module 58 preferably includes a voice command and speech processing card, such as the "Voice Master" Model PCKS-PO-310 card available from Covox inc. of Eugene, Or., which may be plugged directly into system bus 52. The speech processing card is provided with software to control the operation of the card and guide the operator through the initial steps required to create a database of digital signals and corresponding digital instructions required to operate the components of the automotive service system. In the voice recognition mode, the speech processing card converts the analog signals received from microphone 10 through transceivers 16 and 16a into digital signals, which are then processed by a digital processor, such as the Motorola DSP 56002. The digital processor refines the digital signals and compares them to the digital signals in the database of digital instructions. When a match between the digital signals is found, CPU 68 transmits the corresponding digital instruction to the appropriate component of the automotive service system. In the voice generation mode, the speech processing card can generate audio signals by playing back pre-recorded voice messeges stored in memory through, for example, a compact disk player device (not shown). In an alternate embodiment, the speech processing card can be adapted to convert the digital data received from CPU 68 on system bus 52 into synthesized voice audio signals, which are then transmitted via transceivers 16a and 16 to speaker 12. In yet another embodiment, speech processor module 58 may comprise a separate sound output means, such as the "Speech Thing" Model STPC-PO-300, also available from Covox inc., for converting digital data received from CPU 68 into synthesized voice audio signals. In this manner, voice commands from the technician can be used to operate the automotive service system and information and data generated by the system can be presented to the technician through speaker 12.

Accordingly, in operation of one embodiment of the present invention, the voice audio presented to the technician can effectively guide the technician in making adjustments to a vehicle component without requiring the technician to divert his attention to the console for presentation of visual information. For example, in operation of a vehicle wheel aligner, alignment values calculated from the measurements obtained from the sensors are compared to stored vehicle specifications, in a manner known to those skilled in the art. According to the present invention, the wheel aligner communicates the differences between the calculated and stored values to the technician via an appropriate voice audio message, such as a message indicating the magnitude and direction by which an alignment value is out of specification. By providing such voice audio messages, the wheel aligner effectively guides the technician in making any necessary adjustments to the vehicle in order to bring the alignment value within specification. In a preferred embodiment of the invention, the wheel aligner also guides the technician in making the actual adjustment, for example by providing a voice audio message identifying the vehicle component requiring adjustment and instructing the technician in how to effect the adjustment. In addition, the wheel aligner may also generate appropriate instructions to guide the technician through the alignment measurement procedure.

In another embodiment of the invention, a telephone module 76 is connected to speech processor module 58. Telephone module 76 is a conventional PBX telephone system and allows the technician to make or receive telephone calls and pages through headset 14. In this embodiment, speech processor module 58 comprises means, such as hard-wired circuitry or software, to switch between telephone module 76 and system bus 52 in response to a voice command from the technician, for example when the technician wishes to make a call or page, or a signal from telephone module 76, for example when an incoming call is being received by telephone module 76. When an incoming call is being received, the switching means preferably enables the technician to either accept or refuse the call, depending on which voice command the technician uses.

The control system of the present invention may also include a security system for permitting selective access to the system by only authorized technicians. The security system may be, for example, a program resident in speech processor module 58 which will allow only those persons who provide a predetermined verbal password to operate the system. Individual passwords may be required for different technicians and the passwords may be categorized to allow certain technicians to operate only certain items of automotive service equipment. This can prevent a technician from using a certain item of equipment before he has had the requisite training necessary to adequately operate the equipment.

The following is an example of the operation of a automotive service system using the control system of the present invention, showing the sequence of commands relating to a vehicle wheel alignment.

Technician: (Starts by turning on the console).

System: "HELLO, GIVE YOUR NAME AND ADDRESS FOR IDENTIFICATION."

Technician: (Responds with name and address).

System: "YOU ARE IDENTIFIED. IF AT ANY TIME YOU WISH TO HAVE ME REPEAT AN INSTRUCTION SAY, 'REPEAT LAST INSTRUCTION'. YOUR FIRST OPTIONS ARE: 'BEGIN ALIGNMENT', 'SET UP', 'LIBRARY', 'FILES', AND 'OTHER'. CHOOSE ONE."

Technician: "BEGIN ALIGNMENT."

System: "STATE IF THIS IS A NEW ALIGNMENT OR A CONTINUATION."

Technician: "NEW ALIGNMENT."

System: "YOUR OPTIONS ARE: '4 WHEEL', 'FRONT WHEEL', 'QUICK READINGS', OR 'DRIVER COMPLAINTS'. CHOOSE ONE."

Technician: "4 WHEEL."

System: "INSTALL VEHICLE ON LIFT AND MEASUREMENT HEADS ON WHEELS. LIFT COMMAND OPTIONS ARE: 'RAISE', 'STOP', AND 'LOWER'. STATE THE WORD 'LIFT' BEFORE 'RAISE' OR 'LOWER'. JACK COMMANDS ARE: 'UP', 'DOWN', AND 'STOP'. STATE THE WORDS 'FRONT JACK' OR 'REAR JACK' BEFORE 'UP' OR 'DOWN'. SAY 'RESUME ALIGNMENT' WHEN READY TO CONTINUE ALIGNMENT. YOU MAY PROCEED NOW."

Technician: "LIFT, RAISE. STOP. (Installs heads). RESUME ALIGNMENT."

System: "STATE VEHICLE MAKE."

Technician: "FORD."

System: "STATE VEHICLE YEAR."

Technician: "93."

System: "STATE VEHICLE MODEL."

Technician: "T-BIRD."

System: "I HAVE NO MATCH. TRY AGAIN; STATE VEHICLE MODEL."

Technician: "THUNDERBIRD."

System: "RAISE VEHICLE ON JACKS TO PERFORM RUNOUT. START AT ANY HEAD WITH WHEEL CLAMP LOCKING KNOB IN THE 9 O' CLOCK POSITION AND STATE WHICH HEAD, FOR EXAMPLE 'RIGHT FRONT HEAD'."

Technician: "FRONT JACK, UP. STOP. REAR JACK, UP. STOP. (Moves clamp so knob is at 9 O'clock). RIGHT FRONT HEAD."

System: "9 O' CLOCK ACCEPTED. GO TO 3 O'CLOCK POSITION."

Technician: (Moves clamp so knob is at 3 O'clock).

System: "3 O'CLOCK ACCEPTED. GO TO 12 O'CLOCK POSITION."

Technician: (Moves clamp so knob is at 12 O'clock).

System: "RUNOUT TAKEN FOR RIGHT FRONT WHEEL. PROCEED TO NEXT WHEEL."

Technician: (Repeats procedure on remaining heads).

System: "RUNOUT PROCEDURE COMPLETE. LOWER WHEELS SO THEY ARE CENTERED ON THE TURN PLATES AND SLIP PLATES, BUT FIRST BE SURE THE LOCKING PINS ARE REMOVED FROM ALL PLATES. JOUNCE THE VEHICLE ON ITS SUSPENSION WHEN DOWN ON PLATES. THEN STATE, 'RESUME ALIGNMENT'. YOU MAY PROCEED NOW."

Technician: "REAR JACK, DOWN. STOP. FRONT JACK, DOWN. STOP. (Jounces vehicle to settle suspension). RESUME ALIGNMENT."

System: "INSTALL PEDAL DEPRESSOR AND SAY 'INSTALLED'."

Technician: (Installs depressor). "INSTALLED."

System: "LEVEL AND LOCK ALL HEADS AND SAY, 'LEVELED AND LOCKED'."

Technician: (Levels and locks all 4 heads). "LEVELED AND LOCKED."

System: "LEFT REAR HEAD IS NOT LEVEL. LEVEL AND LOCK IT AND SAY, 'LEVELED AND LOCKED'."

Technician: (Levels and locks left rear head). "LEVELED AND LOCKED."

System: "CENTER FRONT WHEELS BY TURNING WHEELS SLOWLY TO THE RIGHT UNTIL I SAY, 'STOP'."

Technician: (Turns wheels right slowly).

System: "STOP. TURN FRONT WHEELS SLOWLY LEFT FOR 10 DEGREES UNTIL I SAY, 'STOP'."

Technician: (Turns front wheels left slowly).

System: "Stop. TURN FURTHER LEFT SLOWLY."

Technician: (Turns further left slowly).

System: "STOP. TURN FRONT WHEELS SLOWLY RIGHT FOR 10 DEGREES UNTIL I SAY, 'STOP'."

Technician: (Turns front wheels right slowly).

System: "STOP. TURN FURTHER RIGHT SLOWLY"

Technician: (Turns further right slowly).

System: "STOP. CENTER FRONT WHEELS BY TURNING LEFT SLOWLY."

Technician: (Turns front wheels left slowly).

System: "STOP. TO CONTINUE, RAISE THE LIFT SO YOU CAN WORK STANDING UNDER THE VEHICLE. SAY 'RESUME ALIGNMENT' WHEN READY."

Technician: "LEFT, RAISE. STOP. RESUME ALIGNMENT."

System: "CONTINUE ALIGNMENT BY ADJUSTING LEFT REAR WHEEL FOR CAMBER BY LOOSENING THE UPPER CONTROL INNER PIVOT RETAINING BOLT, THEN ROTATE THE ECCENTRIC BOLT SLOWLY COUNTER-CLOCKWISE UNTIL I SAY, 'STOP'."

Technician: (Loosens pivot retaining bolt and rotates the eccentric CCW).

System: "STOP. NOW RE-TIGHTEN THE INNER PIVOT RETAINING BOLT AND SAY, 'BOLT TIGHT'."

Technician: (Re-tightens bolt). "BOLT TIGHT."

System: "CAMBER SETTING IS NOW MINUS 0.63 DEGREES ON LEFT REAR WHEEL AND WITHIN SPECIFICATION, REQUIRING NO FURTHER ADJUSTMENT. CAMBER SETTING FOR RIGHT REAR WHEEL IS MINUS 0.24 DEGREES AND WITHIN SPECIFICATION, REQUIRING NO ADJUSTMENT FOR CAMBER. REAR WHEELS NEED ADJUSTMENT IN TOE, SO ON THE RIGHT REAR WHEEL LOOSEN THE LOWER CONTROL ARM INNER PIVOT RETAINING BOLT AND ROTATE CAM BOLT CLOCKWISE UNTIL I SAY 'STOP'."

Technician: (Makes adjustment).

System: "STOP. RE-TIGHTEN PIVOT BOLT AND SAY, 'BOLT TIGHT'."

Technician: (Re-tightens pivot bolt). "BOLT TIGHT."

System: "ON THE LEFT REAR WHEEL, LOOSEN THE LOWER CONTROL ARM INNER PIVOT RETAINING BOLT AND ROTATE CAM BOLT COUNTER-CLOCKWISE UNTIL I SAY 'STOP'."

Technician: (Makes adjustment)

System: "STOP. RE-TIGHTEN PIVOT BOLT AND SAY, 'BOLT TIGHT'."

Technician: (Re-tightens pivot bolt). "BOLT TIGHT."

System: "TOE ON REAR WHEELS IS NOW POSITIVE ⅛ INCH AND WITHIN SPECIFICATION AND REQUIRES NO FURTHER ADJUSTMENT. LOWER THE LIFT AND START VEHICLE ENGINE AND WITH ENGINE RUNNING STEER THE STEERING WHEEL TO THE LEVEL POSITION. INSTALL THE STEERING WHEEL CLAMP TO HOLD THE STEERING WHEEL IN THE LEVEL POSITION. STOP THE ENGINE AND RAISE THE LIFT SO YOU CAN WORK STANDING UNDER THE VEHICLE. SAY, 'RESUME ALIGNMENT' WHEN READY. YOU MAY PROCEED NOW."

Technician: "LIFT, LOWER. STOP." (Starts engine, levels steering wheel, and stops engine). "LIFT, RAISE. STOP. RESUME ALIGNMENT."

System: "THE LEFT FRONT WHEEL IS OUT OF SPECIFICATION IN CASTER AND SHOULD BE ADJUSTED. LOOSEN THE INSIDE STRUT ROD BUSHING RETAINER NUT 2 AND ½ TURNS AND TIGHTEN TIM OUTER STRUT ROD BUSHING RETAINER NUT UNTIL IT IS TIGHT. THEN SAY, 'NUT TIGHT'."

Technician: (Makes adjustment). "NUT TIGHT."

System: "THE LEFT FRONT WHEEL IS NOW POSITIVE 5.98 DEGREES IN CASTER AND IS WITHIN SPECIFICATION AND REQUIRES NO FURTHER ADJUSTMENT IN CASTER. THE LEFT FRONT WHEEL IS OUT OF ADJUSTMENT IN CAMBER AND SHOULD BE ADJUSTED. LOOSEN LOWER CONTROL ARM PIVOT RETAINING BOLT AND ROTATE CAM BOLT INWARD SLOWLY UNTIL I SAY, 'STOP'."

Technician: (Makes adjustment).

System: "STOP. NOW RE-TIGHTEN PIVOT RETAINING BOLT AND SAY, 'BOLT TIGHT'."

Technician: (Tightens pivot retaining bolt). "BOLT TIGHT."

System: "THE LEFT FRONT WHEEL IS NOW MINUS 1.05 DEGREES IN CAMBER AND WITHIN SPECIFICATION AND REQUIRES NO FURTHER ADJUSTMENT. THE RIGHT FRONT WHEEL IS WITHIN SPECIFICATION ON CASTER AND CAMBER AND REQUIRES NO ADJUSTMENT OF THESE. THE TOE OF THE FRONT WHEELS IS OUT OF SPECIFICATION AND SHOULD BE ADJUSTED. LOOSEN THE TIE ROD RETAINING JAM NUT ON THE RIGHT FRONT WHEEL TIE ROD AND ROTATE THE TIE ROD SLOWLY TO SHORTEN IT UNTIL I SAY, 'STOP'."

Technician: (Loosens nut and starts the tie rod rotation in the direction that would lengthen the adjustment).

System: "STOP. WRONG DIRECTION. ROTATE IN THE OTHER DIRECTION."

Technician: Rotates tie rod in the opposite direction).

System: "STOP. NOW RE-TIGHTEN THE JAM NUT AND SAY, 'NUT TIGHT'."

Technician: (Tightens the nut). "NUT TIGHT."

System: "LOOSEN THE TIE ROD RETAINING JAM NUT ON THE LEFT FRONT WHEEL TIE ROD AND ROTATE THE TIE ROD SLOWLY TO SHORTEN IT UNTIL I SAY, 'STOP'."

Technician: (Loosens nut and rotates the tie rod).

System: "STOP. RE-TIGHTEN THE JAM NUT AND SAY, 'NUT TIGHT'."

Technician: (Tightens nut). "NUT TIGHT."

System: "TOE IS NOW ZERO AND WITHIN SPECIFICATION AND REQUIRES NO FURTHER ADJUSTMENT. YOU MAY LOWER LIFT AND REMOVE HEADS FROM THE WHEELS. ALIGNMENT IS COMPLETE."

Technician: "LIFT, LOWER." (Removes and stows heads).

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a vehicle wheel alignment system having a central processing unit for controlling the operation of the system, the improvement which comprises:
   a microphone; and
   means for converting voice commands received by the microphone into operation instructions which can be processed by the central processing unit;
   to control the operation of a component of the wheel alignment system through voice commands.

2. The system of claim 1, wherein the microphone is mounted in a headset which can be worn by the technician.

3. A vehicle wheel alignment system having a central processing unit for controlling the operation of the system, which comprises:
   means in communication with the central processing unit for producing data indicative of the operational steps required to make an adjustment to a vehicle component;

means for converting the data into electrical voice audio signals indicative of spoken procedural instructions that vocally guide an operator to perform the adjustment; and a speaker for converting the electrical voice audio signals into voice audio messages that comprise spoken procedural instructions that vocally guide an operator to perform the adjustment;

a microphone; and means for converting voice commands received by the microphone into operation instructions which can be processed by the central processing unit to control the operation of a component of the wheel alignment system through voice commands.

4. The system of claim 3, further comprising transceiver means for relaying communications between the data converting means and the speaker and between the microphone and the voice command converting means.

5. The system of claim 4, wherein the transceiver means comprises wireless transceiver means.

6. The system of claim 5, wherein the wireless transceiver means comprises a radio frequency transceiver.

7. The vehicle wheel alignment system of claim 3 wherein the instructions comprise words indicating at least one from the group consisting of: which automotive part to adjust, what automotive part to add, what automotive part to remove, and the magnitude and direction of the adjustment.

8. In combination with a vehicle wheel alignment system having a controller for controlling the operation of at least one component of the wheel alignment system, the improvement which comprises:

a microphone;

means for converting voice commands received by the microphone into operation instructions for controlling operation of the at least one component of the wheel alignment system, which instructions can be processed by the controller;

wearable display for visually displaying data received from the controller;

the wearable display comprising goggles which can be worn by a technician;

the goggles including means for projecting an image of the data into a forward field of view of the technician;

whereby a technician can control the operation of the at least one component of the wheel alignment system through voice commands and receive data therefrom via the wearable display.

9. The system of claim 8 further comprising means for transmitting data from the to the wearable display.

10. A vehicle wheel aligner for guiding an operator in making adjustments to a vehicle in order to bring an alignment measurement of the vehicle to within a known specification, which comprises:

at least one angle measuring instrument mountable relative to at least one wheel of the vehicle for generating signals representative of the relative angular orientation of the at least one wheel;

controller means for determining the alignment measurement from the signals generated by the at least one angle measuring instrument and for producing data indicative of a difference between the alignment measurement and the known specification;

means responsive to the data from the controller means for generating electrical voice audio signals indicative of the difference between the alignment measurement and the known specification and further indicative of spoken procedural instructions that vocally guide an operator to perform the adjustment; and a speaker for converting the electrical voice audio signals into audible voice audio messages that comprise spoken procedural instructions that vocally guide an operator to perform the adjustment;

wherein the wheel aligner generates voice audio messages indicative of the difference between the alignment measurement and the specification to thereby guide the operator in making the adjustments to bring the alignment measurement to within specification.

11. The wheel aligner of claim 10, wherein the controller means functions to control the operation of the wheel aligner and the wheel aligner further comprises:

a microphone; and means for converting voice commands received by the microphone into operation instructions which can be processed by the controller means;

whereby the operator can control the operation of the wheel aligner through voice commands.

12. The wheel aligner of claim 11, further comprising transceiver means for relaying communications between the data converting means and the speaker and between the microphone and the voice command converting means.

13. The wheel aligner of claim 12, wherein the transceiver means comprises wireless transceiver means.

14. The apparatus of claim 13, wherein the wireless transceiver means comprises a radio frequency transceiver.

15. The wheel aligner of claim 10, further comprising a wearable display means for visually displaying the data produced by the controller means.

16. The wheel aligner of claim 10 wherein the instructions comprise words indicating at least one from the group consisting of: which wheel to adjust, what alignment part to add, what alignment part to remove, and the magnitude and direction of the adjustment.

17. A method for guiding an operator in making adjustments to a vehicle in order to bring an alignment measurement of the vehicle to within a known specification, which comprises:

measuring the relative angular orientation of at least one wheel of the vehicle;

determining the alignment measurement from the angular orientation of the at least one wheel;

determining a difference between the alignment measurement and the known specification; and electrically generating a voice audio message indicative of the difference between the alignment measurement and the known specification, such that the voice audio message guides the operator in performing the adjustments by providing spoken procedural instructions.

18. The method of claim 17, further comprising:

generating a voice audio message identifying components of the vehicle requiring the adjustments; and generating voice audio messages instructing the operator in how to effect the adjustments.

19. In combination with a vehicle wheel alignment having a controller for controlling the operation of the system, the improvement which comprises:

a microphone;

means for converting voice commands received by the microphone into operation instructions for controlling operation of at least one component of the wheel alignment system, which instructions can be processed by the controller; and a wearable display for visually displaying data received from the controller;

whereby a technician can control the operation of the wheel alignment system through voice commands and receive data therefrom via the wearable display.

20. The system of claim 19 further comprising means for transmitting data from the controller to the wearable display.

* * * * *

UNITED STATES PATENT AND TRADEMARK OFFICE
CERTIFICATE OF CORRECTION

PATENT NO. : 6,085,428
DATED : July 11, 2000
INVENTOR(S) : Casby et al.

It is certified that error appears in the above-identified patent and that said Letters Patent is hereby corrected as shown below:

<u>Column 8, claim 1,</u>
Line 56, please delete ";" after "unit."

Signed and Sealed this

Fourth Day of December, 2001

Attest:

NICHOLAS P. GODICI
*Attesting Officer*   *Acting Director of the United States Patent and Trademark Office*